United States Patent [19]
Yoshikawa

[11] Patent Number: 5,419,505
[45] Date of Patent: May 30, 1995

[54] SPINNING REEL HAVING A STOPPER FOR LIMITING SPOOL MOVEMENT

[75] Inventor: Osamu Yoshikawa, Sakai, Japan
[73] Assignee: Shimano Inc., Osaka, Japan
[21] Appl. No.: 926,631
[22] Filed: Aug. 10, 1992
[30] Foreign Application Priority Data
  Aug. 19, 1991 [JP] Japan ............... 3-065240 U
[51] Int. Cl.6 .............................................. A01K 89/00
[52] U.S. Cl. ......................................... 242/322; 403/4; 403/164
[58] Field of Search ............... 242/322, 224, 230, 231, 242/232, 233; 403/3, 4, 164, 165

[56] References Cited

U.S. PATENT DOCUMENTS

| | | | |
|---|---|---|---|
| 4,203,565 | 5/1980 | Puryear | 242/322 X |
| 4,222,534 | 9/1980 | Ishida | 242/322 |
| 4,243,339 | 1/1981 | Dickerson | 403/4 |
| 4,559,843 | 12/1985 | Nilsson | 403/3 |
| 4,687,365 | 8/1987 | Promersberger | 403/164 |
| 5,078,334 | 1/1992 | Zanon | 242/322 |

FOREIGN PATENT DOCUMENTS
  2643544  8/1990  France ...................... 242/322

*Primary Examiner*—Daniel P. Stodola
*Assistant Examiner*—Eileen A. Dunn
*Attorney, Agent, or Firm*—Dickstein, Shapiro & Morin

[57] ABSTRACT

A spinning reel includes a spool mounted on a spool shaft. An engaging mechanism is disposed in a rear end region of the spool for interconnecting the spool and spool shaft to allow torque transmission therebetween, and limiting rearward movement of the spool. A stopper is disposed in a front end region of the spool for limiting forward movement of the spool. The engaging mechanism includes an engaging piece formed on the spool shaft, and an engaging portion for contacting the engaging piece to prevent the spool from rotating relative to the spool shaft. An elastic retainer is provided for preventing relative rotation or relative axial movement between the spool and spool shaft when the engaging mechanism is in operation.

11 Claims, 5 Drawing Sheets

SPINNING REEL HAVING A STOPPER FOR LIMITING SPOOL MOVEMENT

BACKGROUND OF THE INVENTION

1. Field of the Invention

This invention relates to spinning reels, and more particularly to an improvement in a spinning reel having a spool mounted on a spool shaft, an engaging mechanism disposed in a rear end region of the spool for interconnecting the spool and spool shaft to allow torque transmission therebetween and limiting rearward movement of the spool, and a stopper disposed in a front end region of the spool for limiting forward movement of the spool.

2. Description of the Related Art

A spinning reel having the above construction is disclosed in Japanese Utility Model Publication Kokai No. 1989-130664, for example. In the prior spinning reel, the stopper is operable by a button or the like to release the spool and allow it to be drawn out forwardly. The engaging mechanism includes an engaging piece in the form of a pin extending through the spool shaft in a direction perpendicular to the axis of the spool shaft, and an engaging portion in the form of recesses in a rear end surface of the spool for receiving the pin.

This prior spinning reel includes a drag mechanism mounted rearwardly of a reel body, and is sometimes called the rear drag type.

In the conventional engaging mechanism as noted above, a pin-receiving through hole is formed in the spool shaft when attaching the engaging piece to the spool shaft. However, it is difficult to form the through hole extending perpendicular to the axis of the spool shaft with high precision. In conventional practice, therefore, the engaging portion is formed to have a circumferential width greater than the diameter of the pin. This allows the pin to be fitted in the engaging portion of the spool even if an error is made in positioning the through hole. The engaging mechanism having such a construction, at an actual fishing time, tends to cause chattering circumferentially of the spool. Thus, there is room for improvement.

Further, the conventional stopper has only the function to limit forward displacement of the spool. Where the engaging mechanism consists of the pin and recesses as noted above, chattering tends to occur longitudinally of the spool due to a manufacturing error or the like. Thus, the stopper also has room for improvement.

The chattering occurring with the spool at an actual fishing time may not seriously affect fishing results. However, such chattering spoils the feel of a line winding operation, and impairs a line winding state.

SUMMARY OF THE INVENTION

The object of the present invention is to provide a spinning reel enabling fishing action with an excellent feel, free from chattering of the spool and without impairing a line winding state.

The above object is fulfilled, according to the present invention, by a spinning reel comprising an engaging mechanism disposed in a rear end region of the spool, and a stopper disposed in a front end region of the spool, as noted in the outset hereof, in which the engaging mechanism includes an engaging piece formed on the spool shaft, and an engaging portion for contacting the engaging piece to prevent the spool from rotating relative to the spool shaft, and an elastic retainer is provided for preventing relative rotation between the spool and spool shaft when the engaging mechanism is in operation, or preventing relative axial movement between the spool and spool shaft when the engaging mechanism is in operation.

The present invention has the following functions and effects.

The above features may be arranged as shown in FIGS. 1 and 2, for example. Even if play is allowed between the engaging piece 11 and engaging portion 12, the elastic retainer T imparts an elastic biasing force to prevent rotation of the spool 5 relative to the spool shaft 7. Consequently, the spool 5 remains unrotatable against an external force acting circumferentially thereof.

Further, the above features may be arranged as shown in FIGS. 3 and 4. In this case, the elastic retainer T imparts an elastic biasing force to prevent movement of the spool 5 axially of the spool shaft 7 even if play is allowed for axial movement of the spool 5 despite engagement between the engaging piece 11 and engaging portion 12 with the stopper 5 in operative position. Consequently, the spool 5 remains axially immovable against an external force acting forwardly or rearwardly thereof.

According to the present invention, since the elastic retainer T has a construction to impart an elastic biasing force, movement or displacement due to play is restricted regardless of an amount of play. Chattering of the spool is eliminated without improving the conventional manufacturing precision.

Thus, the present invention provides an improved spinning reel enabling fishing action with an excellent feel, free from chattering of the spool and without impairing a line winding state.

Other features and advantages of this invention will be apparent from the following description taken with reference to the accompanying drawings.

DETAILED DESCRIPTION OF THE PREFERRED EMBODIMENTS

A spinning reel according to the present invention will be described in detail with reference to the drawings.

Figure 1:
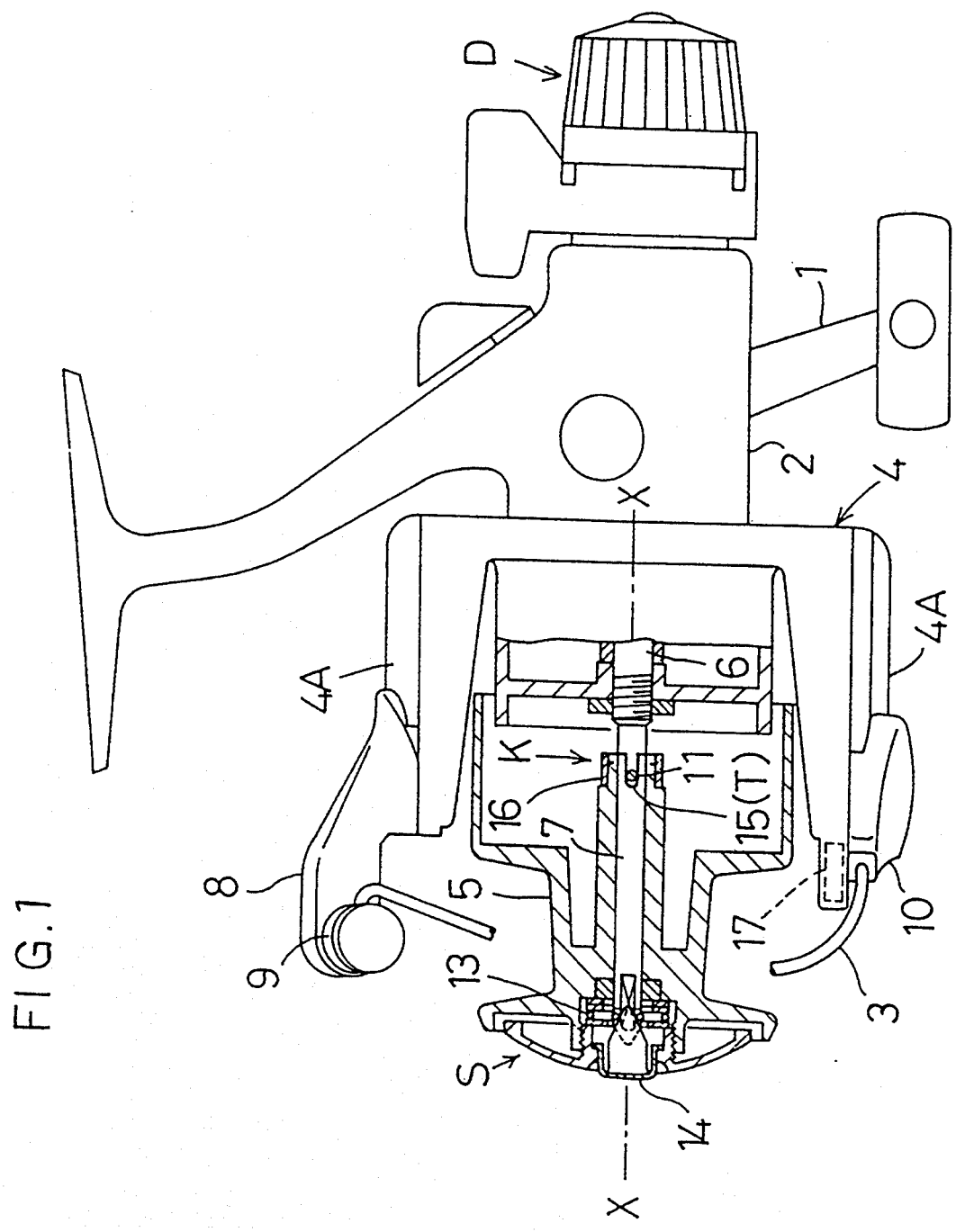
FIG. 1 is a side view, partly in section, of a spinning reel.

As shown in FIG. 1, this spinning reel includes a handle 1 attached to a reel body 2, a rotor 4 carrying a bail arm 3 and mounted on a forward portion of the reel body 2, and a spool 5 also mounted on the forward portion of the reel body 2 for winding a fishing line (not shown). The reel body 2 has a sleeve shaft 6 for transmitting drive from the handle 1 to the rotor 4, and a spool shaft 7 for supporting the spool 5.

The rotor 4 defines a pair of arms 4A opposed to each other across an axis (rotational axis) X of the spool 5. The bail 3 extends between an arm cam 8 and line roller 9 attached to one of the arms 4A and an oscillatable arm 10 attached to the other arm 4A. The bail 3 is switchable between a release position and a winding position.

The spool 5 is rotatably supported by and extending in a fore and aft direction of the reel body 2. The reel body 2 has a drag mechanism D disposed rearwardly thereof for applying a braking force to rotation of the spool shaft 7. The spool 5 is connected at a rear end thereof to the spool shaft 7 for torque transmission. An engaging mechanism K is provided at the rear end of the spool 5 for limiting rearward movement of the spool 5. Further, a stopper S is provided in a forward position of the spool 5 for limiting forward movement of the spool 5.

Figure 2:
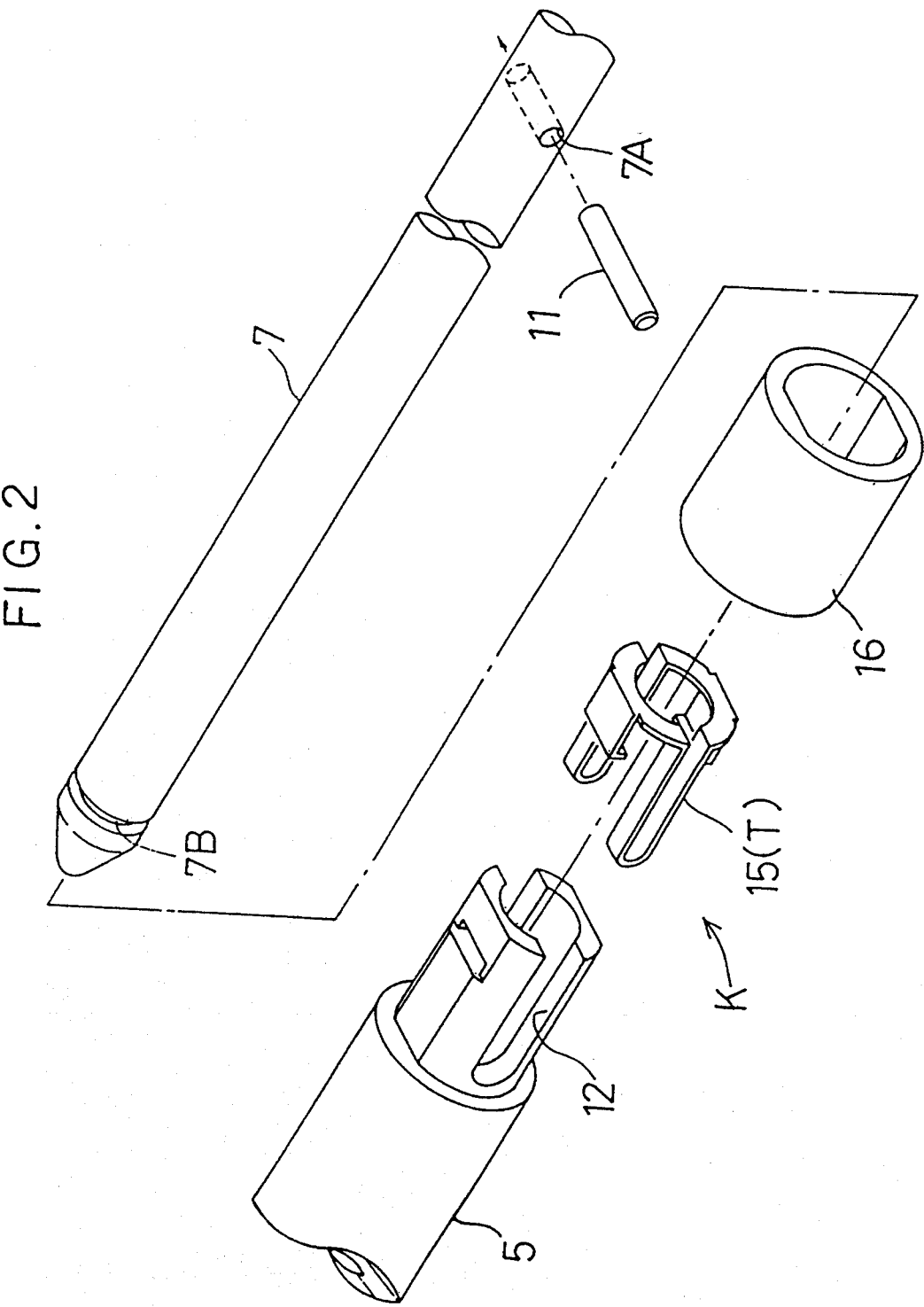
FIG. 2 is an exploded perspective view of an engaging mechanism.

As shown in FIGS. 1 and 2, the engaging mechanism K includes an engaging piece 11 which is a pin fixedly inserted into a through hole 7A formed in the spool shaft 7 and extending perpendicular to the axis X, and a recessed engaging portion 12 formed integral with the spool 5 for engaging the engaging piece 11. The stopper S includes a wire element 13 for engaging an annular groove 7B defined in a forward end position of the spool shaft 7, and a button 14 for controlling the wire element 13 to render the spool 5 detachable from the spool shaft 7. This reel further includes an elastic retainer T disposed in a region of the engaging mechanism K for preventing relative rotation between the spool shaft 7 and spool 5, thereby to eliminate chattering circumferentially of the spool 5.

The elastic retainer T is in the form of a plate spring 15 fitted in the engaging portion 12. The elastic retainer T grips the engaging piece 11 therein to prevent the spool 7 from being circumferentially displaced relative to the spool shaft 7.

The plate spring 15 is retained in place by a sleeve 16 fitted around the engaging portion 12.

As seen from FIG. 1, the arm 4A supporting the oscillatable arm 10 extends further forwardly than the other arm 4A. A balancer 17 is mounted in a forwardly extended portion of the arm 4A supporting the oscillatable arm 10, to counteract weight of the line roller 9 and the like for an improved rotational balance.

Figure 3:
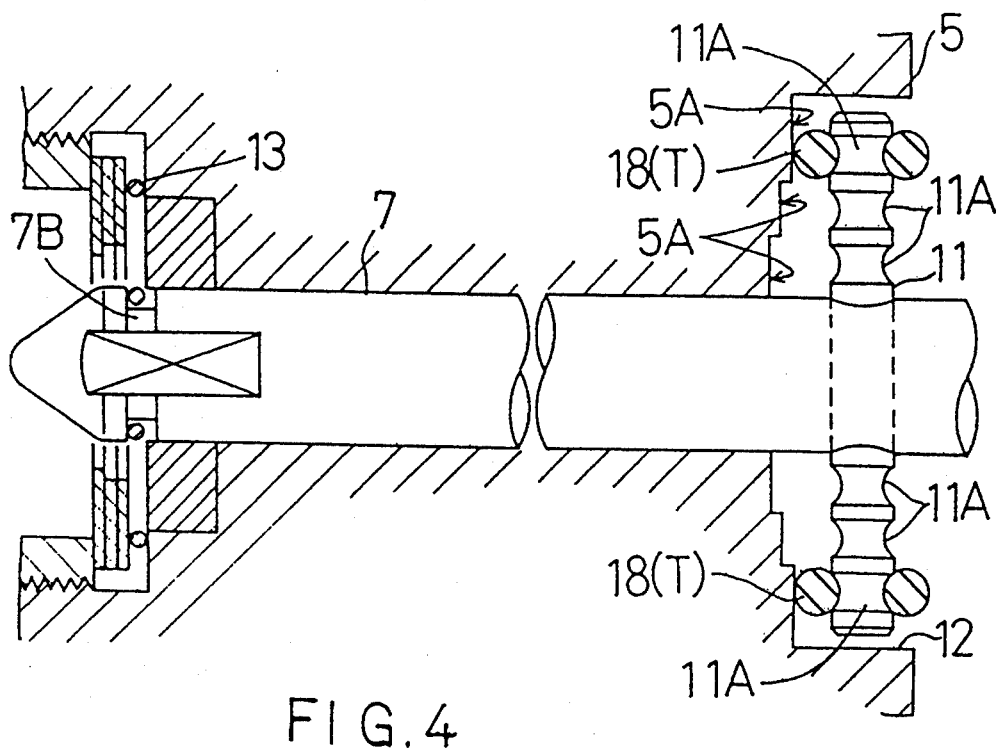
FIG. 3 is a side view in vertical section of a different embodiment (a)
Figure 4:
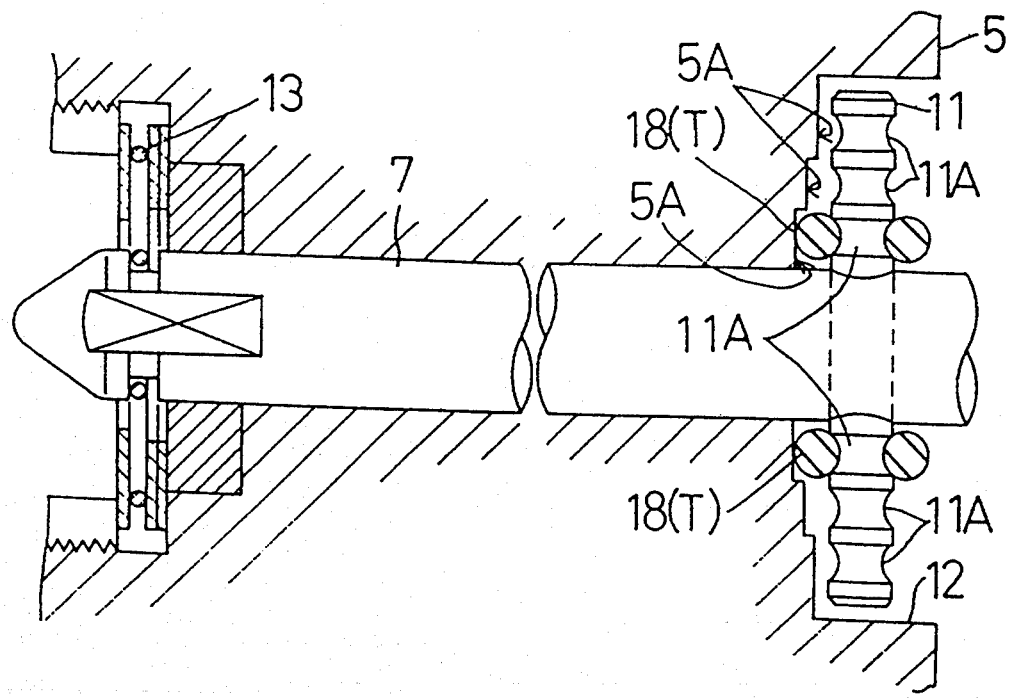
FIG. 4 is a side view in vertical section of the different embodiment (a), with a varied elastic biasing force.

The present invention may be implemented in the following forms as distinct from the foregoing embodiment:

(a) As shown in FIGS. 3 and 4, an engaging piece 11 of the pin type as in the foregoing embodiment has a plurality of annular grooves 11A defined in intermediate positions thereof. The spool 5 has contact surfaces 5A defined on the rear end thereof lying adjacent the intermediate positions of the engaging piece 11. These contact surfaces 5A receive pressure of the elastic retainer T acting axially of the spool 5. O-rings 18 formed of rubber are fitted on the engaging piece 11 for contacting the contact surfaces 5A, so that the elasticity of the O-rings 18 limits axial displacement of the spool 5.

Thus, the O-rings 18 act as the elastic retainer T in this construction. The O-rings 18 are fitted selectively in the annular grooves 11A of the engaging piece 11 to vary the biasing force applied from the O-rings 18 to the spool 5. This eliminates chattering occurring axially of the spool 5 regardless of an amount of fore and aft play allowed for the spool 5. The engaging portion 12 has a predetermined width for contacting outer surfaces of the O-rings 18. The O-rings formed of rubber may have a rectangular section instead of the illustrated circular section.

Figure 5:
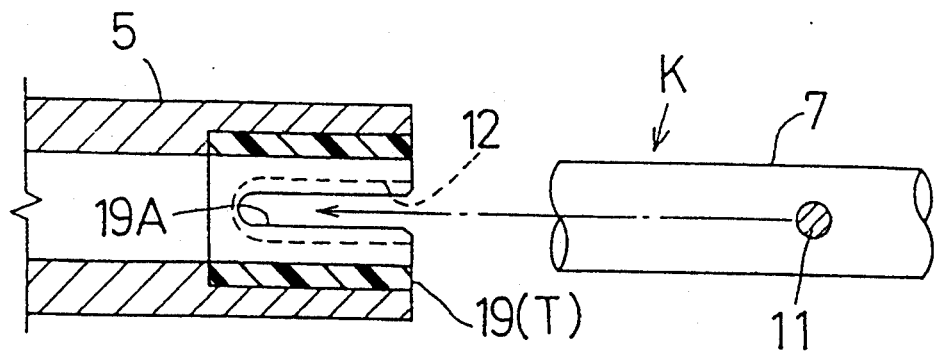
FIG. 5 is a side view in vertical section of a different embodiment (b)
Figure 6:
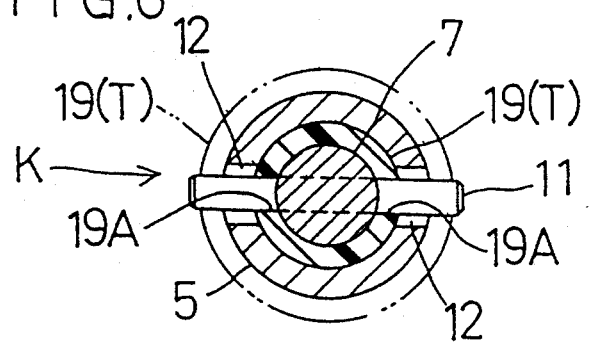
FIG. 6 is a rear view in vertical section of the different embodiment (b)

(b) As shown in FIGS. 5 and 6, the engaging mechanism K, as in the preceding embodiments, includes an engaging piece 11 in the form of a pin, and a recessed engaging portion 12. A rubber tube 19 is fitted in the engaging portion 12 to act as elastic retainer T. This rubber tube 19 defines slits 19A for embracing the engaging piece 11.

According to this construction, the elastic retainer T may be formed around outer peripheries of the engaging portion 12 as shown in phantom lines in FIG. 6.

Figure 7:
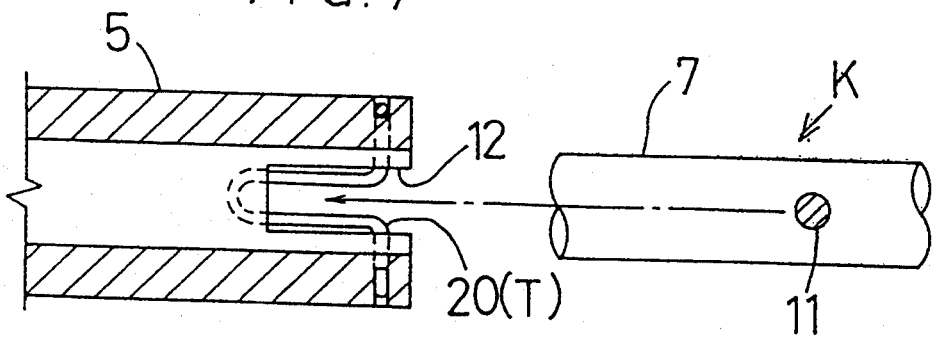
FIG. 7 is a side view in vertical section of a different embodiment (c)
Figure 8:
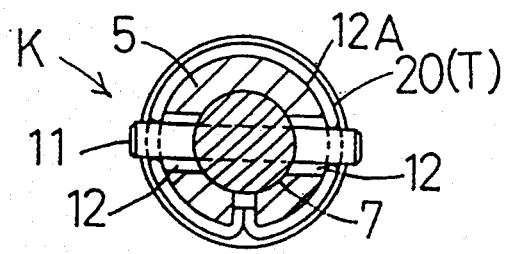
FIG. 8 is a rear view in vertical section of the different embodiment (c)

(c) As shown in FIGS. 7 and 8, the engaging mechanism K, as in the preceding embodiments, includes an engaging piece 11 in the form of a pin, and a recessed engaging portion 12. A piano wire 20 is fitted around the engaging portion 12 to act as elastic retainer T. This piano wire 20 includes U-shaped curves for embracing the engaging piece 11.

According to this construction, the piano wire 20 extends into an annular groove 12A formed peripherally of the engaging portion 12. This prevents the piano wire 20 or elastic retainer T from falling off the engaging portion 12.

Figure 9:
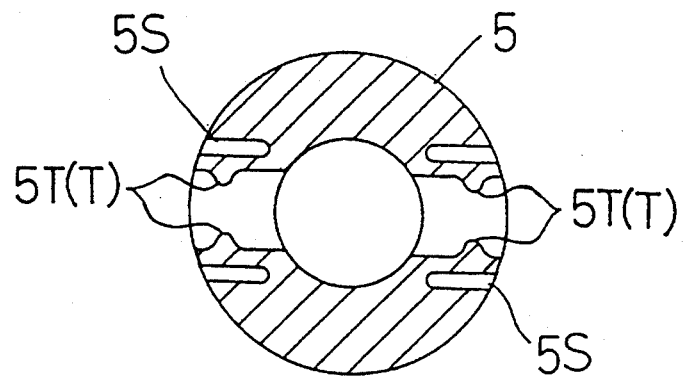
FIG. 9 is a rear view in vertical section of a different embodiment (d)
Figure 10:
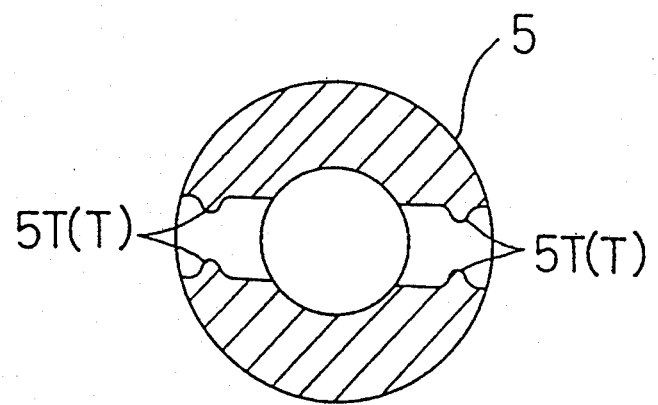
FIG. 10 is a rear view in vertical section of a modification of the different embodiment (d).

(d) As shown in FIGS. 9 and 10, the engaging mechanism K, as in the preceding embodiments, includes an engaging piece 11 in the form of a pin, and a recessed engaging portion 12. The spool 5 has pairs of pinch projections 5T formed as integral peripheral part thereof and shaped to embrace the engaging piece 11. Thus, the elastic retainer T is formed without using an additional element.

In the construction shown in FIG. 9, the spool 5 defines slits 5S to enhance the elastic retaining force of the pinch projections 5T.

(e) According to the present invention, a spinning reel may include two elastic retainers for preventing circumferential chattering of the spool and axial chattering thereof, respectively.

(f) The present invention is not limited in application to the rear drag type spinning reel. The invention is applicable also to a casting reel having a fixed spool shaft and to a spinning reel in which a rotor is braked directly by operating a lever or the like.

What is claimed is:

1. A spinning reel comprising:

a spool shaft having an axis;

a spool mounted on said spool shaft, said spool including a forward portion;

means for winding a fishing line onto said spool;

a first engaging mechanism to restrict a forward movement of said spool relative to said spool shaft, said first engaging mechanism being provided between said spool and said spool shaft, and said first engaging mechanism being placed at said forward portion of said spool;

a second engaging mechanism to restrict rearward movement of said spool relative to said spool shaft and rotation of said spool relative to said spool shaft, said second engaging mechanism including:

an engaging piece extending from said spool shaft along a radial axis of said spool shaft;

an engaging recess formed on said spool to receive said engaging piece;

resilient retaining means, provided between said engaging piece and said engaging recess, for resiliently retaining said engaging piece in said engaging recess axially and circumferentially of said axis;

wherein said resilient retaining means has a first portion and a second portion, and wherein said engaging piece is held between said first and second portions.

2. A spinning reel of claim 1, wherein said first engaging mechanism comprises an annular channel formed near a front end of said spool shaft and a wire element provided on said spool, said wire element being engageable in said annular channel.

3. A spinning reel of claim 1, wherein said resilient retaining means comprises a plate spring mounted in said engaging recess to resiliently hold said engaging piece.

4. A spinning reel of claim 3, wherein said resilient retaining means further comprises a sleeve attachment mounted over said engaging recess to prevent said plate spring from falling off from said engaging recess.

5. A spinning reel of claim 1, wherein said second engaging mechanism further includes an annular groove formed in said engaging piece, and wherein said resilient retaining means includes a resilient O-ring mounted on said annular groove.

6. A spinning reel of claim 5, wherein said second engaging mechanism further includes a plurality of annular grooves formed in said engaging piece and successively aligned along said radial axis, and wherein a surface of said engaging recess faces axially of said spool shaft and includes a plurality of faces each located a different distance from said first engaging mechanism.

7. A spinning reel of claim 1, wherein said resilient retaining means comprises a sleeve member inserted in said spool adjacent said engaging recess, said sleeve member including a slit to resiliently hold said engaging piece.

8. A spinning reel of claim 7, wherein said sleeve member comprises a rubber member.

9. A spinning reel of claim 1, wherein said resilient retaining means comprises a wire element mounted on said spool adjacent said engaging recess, said wire element including a U-shaped portion to resiliently hold said engaging piece.

10. A spinning reel of claim 1, wherein said resilient retaining means includes a protrusion extending from said engaging recess in a circumferential direction of said axis to resiliently hold said engaging piece.

11. A spinning reel of claim 10, wherein said resilient retaining means includes a slit formed in said spool adjacent said engaging recess to facilitate a resilient displacement of said protrusion.

* * * * *